(12) United States Patent
Fleischer et al.

(10) Patent No.: US 10,431,352 B2
(45) Date of Patent: Oct. 1, 2019

(54) CABLE AND METHOD FOR PRODUCING A CABLE

(71) Applicant: Gebauer & Griller Kabelwerke Gesellschaft M.B.H., Vienna (AT)

(72) Inventors: Gottfried Fleischer, Poysdorf (AT); Karl Fröschl, Hernnbaumgarten (AT)

(73) Assignee: Gebauer & Griller Kabelwerke Gesekkschaft M.B.H., Vienna (AT)

( * ) Notice: Subject to any disclaimer, the term of this patent is extended or adjusted under 35 U.S.C. 154(b) by 0 days.

(21) Appl. No.: 15/571,031

(22) PCT Filed: May 6, 2016

(86) PCT No.: PCT/AT2016/050130
§ 371 (c)(1),
(2) Date: Oct. 31, 2017

(87) PCT Pub. No.: WO2016/176711
PCT Pub. Date: Nov. 10, 2016

(65) Prior Publication Data
US 2018/0166185 A1 Jun. 14, 2018

(30) Foreign Application Priority Data
May 6, 2015 (AT) .............................. A 50365/2015

(51) Int. Cl.
*H01B 7/00* (2006.01)
*H01B 7/282* (2006.01)
(Continued)

(52) U.S. Cl.
CPC .............. *H01B 7/282* (2013.01); *H01B 7/18* (2013.01); *H01B 7/24* (2013.01); *H01B 11/02* (2013.01);
(Continued)

(58) Field of Classification Search
CPC . H01B 7/232; H01B 7/18; H01B 7/24; H01B 11/02; H01B 13/228; H01B 13/26
(Continued)

(56) References Cited

U.S. PATENT DOCUMENTS 3,484,541 A * 12/1969 Campbell .............. H02G 15/18
174/138 F
3,519,731 A * 7/1970 Grunbaum ......... H01R 13/5045
174/138 F
(Continued)

FOREIGN PATENT DOCUMENTS

DE 3903059 A1 8/1990
DE 202009013471 U1 6/2010
(Continued)

OTHER PUBLICATIONS

European Patentamt, "International Search Report of the International Searching Authority," in connection to PCT/AT2016/050130, filed May 6, 2016, dated Sep. 16, 2016.
(Continued)

*Primary Examiner* — William H. Mayo, III
(74) *Attorney, Agent, or Firm* — McKee, Voorhees & Sease, PLC

(57) ABSTRACT

The invention relates to a cable (1) with at least one strand (2) having twisted litz wires (3) for conducting electrical current and an insulation sheath (4) surrounding the at least one strand (2) for electrically insulating the at least one strand (2). The cable (1) has an interruption section (5) without an insulation sheath (4) between two cable sections (6, 6') with an insulation sheath (4). According to the invention, the twisted weave of the at least one strand (2) is loosened in the interruption section (5), in order to interrupt the transport of moisture through the cable (1), in particular through the at least one strand (2), that results from capillary pressure and/or temperature-related pressure differences
(Continued)

along the cable (1), such that the pressure in the interruption section (5) can equalize with that of the exterior.

16 Claims, 4 Drawing Sheets

(51) Int. Cl.
*H01B 7/18* (2006.01)
*H01B 7/24* (2006.01)
*H01B 11/02* (2006.01)
*H01B 13/22* (2006.01)
*H01B 13/26* (2006.01)

(52) U.S. Cl.
CPC ........... *H01B 13/228* (2013.01); *H01B 13/26* (2013.01); *Y02A 30/14* (2018.01)

(58) Field of Classification Search
USPC ......... 174/36, 102 R, 108, 109, 110 R, 74 R, 174/84 R
See application file for complete search history.

(56) References Cited

U.S. PATENT DOCUMENTS

| | | | | |
|---|---|---|---|---|
| 5,796,041 A * | 8/1998 | Suzuki | ................... | H02G 15/18 174/92 |
| 5,846,467 A | 12/1998 | Saito et al. | | |
| 5,945,634 A * | 8/1999 | Shimirak | ............. | H01R 9/0509 174/71 C |
| 6,376,774 B1 * | 4/2002 | Oh | ......................... | H01H 85/10 174/92 |
| 7,842,210 B2 * | 11/2010 | Chen | ....................... | B29C 39/10 264/135 |
| 9,437,349 B2 * | 9/2016 | Saito | ....................... | H01B 7/282 |
| 2005/0167147 A1 * | 8/2005 | Marsac | ................ | G02B 6/4446 174/92 |
| 2014/0299353 A1 * | 10/2014 | Saito | ...................... | H01B 7/282 174/113 R |

FOREIGN PATENT DOCUMENTS

| | | | |
|---|---|---|---|
| DE | 102011083952 A | * | 4/2013 |
| DE | 102011083952 A1 | | 4/2013 |

OTHER PUBLICATIONS

Austrian Patent Office, "Search Report" in connection to Austrian Application No. A 50365/2015, filed May 6, 2015, dated Nov. 26, 2015.
European Patentamt, "Written Opinion of the International Searching Authority," in connection to PCT/AT2016/050130, filed May 6, 2016, dated 2016.
Machine Translation of DE 3903059, accessed on Sep. 7, 2017.
Machine Translation of DE 303009023471, accessed on Sep. 7, 2017.
Machine Translation of DE 102011083952, accessed on Sep. 7, 2017.
Espacenet Abstract of DE102011083952, accessed on Sep. 7, 2017.
Espacenet Abstract of DE13903059, accessed on Sep. 7, 2017.

* cited by examiner

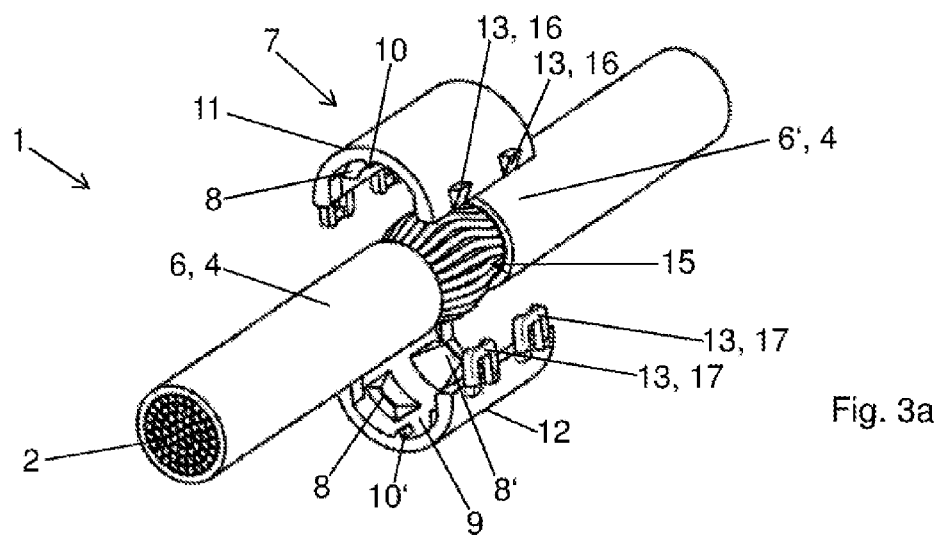
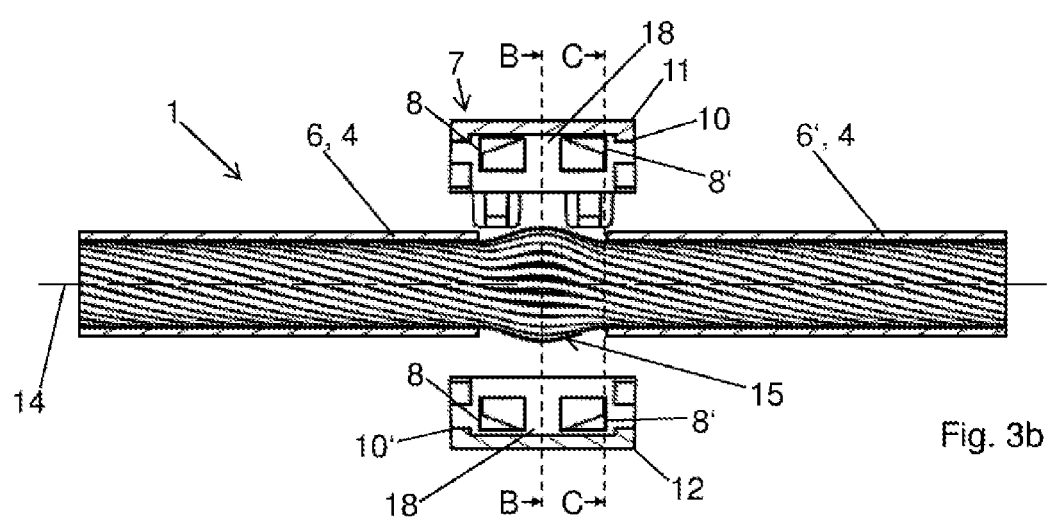
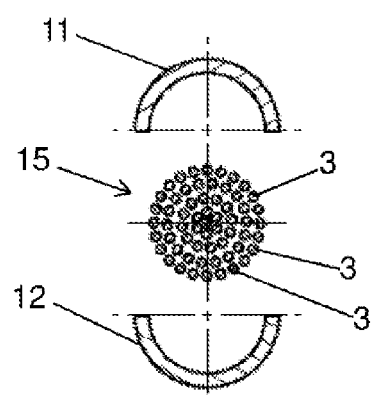 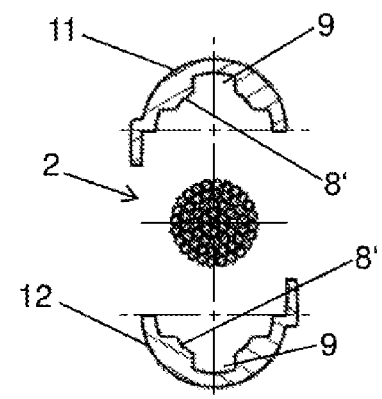
Fig. 3a
Fig. 3b
Fig. 3c
Fig. 3d

CABLE AND METHOD FOR PRODUCING A CABLE

CROSS-REFERENCE TO RELATED APPLICATION

This application claims benefit under 35 U.S.C. § 119 or § 120 to Austrian application Serial No. AT GM 50365/2015 filed May 6, 2015, herein incorporated by reference in its entirety.

FIELD OF INVENTION

This invention comprises a cable comprising at least one litz wire having twisted litz wire strands for conducting electrical current and an insulation sheath surrounding the at least one litz wire for electrical insulation of the at least one litz wire, where the cable exhibits an interruption segment without insulation sheath disposed between two cable segments with insulation sheath.

This invention also concerns a method for producing a cable, where a cable is used that comprises at least one litz wire having twisted litz wire strands for conducting electrical current and an insulation sheath surrounding the at least one litz wire for electrical insulation of the at least one litz wire, where an interruption segment is produced by removing the insulation sheath between two cable segments with insulation sheath.

BACKGROUND OF THE INVENTION

Electrical cables, chiefly when used in vehicles and electrical machines, are made to be highly flexible, with multi-wire conductor construction in the form of at least one litz wire having litz wire strands. The electrical insulation of the litz wire is usually carried out in an extrusion operation, through which the litz wire becomes completely surrounded with insulation material in the form of an insulation sheath. In order to obtain a flexible, bendable cable, it is necessary that the litz wire strands be disposed as close as possible to each other and that a lengthwise balancing of the litz wire strands when the conductor is bent be enabled by twisting them.

The laying of the litz wire strands close together produces voids, which are disposed in narrow channels between the litz wire strands along the cable. These thin channels produce a capillary pressure, which is capable of drawing water into the cable. Temperature variations between the ends of the cable, which may occur in use, can cause varying pressure differences in the cable, through which the water can be transported through the cable, until it has ultimately migrated through the entire cable. This can lead to corrosion of contact points.

To solve this problem, in the prior art both cable ends are elaborately sealed. In the case of plug connections this problem is solved through the construction of sealed plug housings. If one-sided cable eyes are used, a shrinkable boot with internal adhesive is usually employed.

However, since the threaded surface of the cable eye is unprotected, a seal cannot be achieved over its lifetime because of corrosion. As soon as water penetrates into the cable, the opposing contact points are thus also threatened.

To prevent a lengthwise transport of water, it is also known from the prior art that a separation of the conductor takes place, in particular between the wet region and dry region, and a sealed transition support point or connector is used, which is either screwed or crimped to the at least one litz wire. This solution is costly and increases the overall electrical resistance, which can be problematic in particular in the case of the onboard electrical networks of vehicles. An example of such a solution is disclosed in DE 202009013471 U1.

It is known from each of DE 102011083952 A1, U.S. Pat. No. 5,846,467 A, and DE 3903059 A1, for sealing or interruption of a capillary flow transport, to birdcage a bundle of litz wires or a litz wire and to fill the resulting space between the litz wires or the litz wire strands with sealing material.

SUMMARY OF THE INVENTION

It is therefore the aim of this invention to make available means that avoid the said disadvantages and a method for producing them. In particular, a transport of liquid or humidity through the cable is to be permanently avoided in a constructively simple and cheap manner and way.

To solve the said problem, in the case of a cable comprising at least one litz wire having twisted litz wire strands for conducting electrical current and an insulation sheath surrounding the at least one litz wire for electrical insulation of the at least one litz wire, it is provided according to the invention that the cable have an interruption segment without insulation sheath disposed between two cable segments with insulation sheath, where the at least one litz wire is birdcaged in the interruption segment in order to interrupt the transport of moisture through the cable, in particular through the at least one litz wire, due to capillary pressure and/or temperature-related pressure differences along the cable. That is, the birdcaging is designed so that the at least one litz wire is opened up or the litz wire strands of the birdcaged litz wire have a spacing apart from each other that is large enough that the capillary action or capillary pressure is reduced, or is essentially eliminated, such that the liquid or moisture that has penetrated into the cable, for example, at a contact point, cannot be transported any further. Moreover, the reduced pressure arising in the cable because of temperature variations along the run of the cable or at the contact points is neutralized or compensated by the intermediate sheath in the interruption segment. That is, an excess pressure can escape in the interruption segment or if there is a reduced pressure, air can be drawn into the interruption segment into the channels or voids. The transport of water through the cable can thus be permanently suppressed in a constructively simple and cheaply produced manner and way without additional sealing measures like shrinkable boots or sealed conductor connectors or transition support points being necessary.

The birdcaging can be realized in a simple way by rotating the at least one litz wire in the direction opposite to the twisting in the interruption segment. This countertwisting of the litz wire in the interruption segment is carried out, relative to the litz wire, in at least one connecting cable segment with insulation sheath. Preferably, for this the litz wire is fixed in place during the countertwisting in at least one connecting cable segment with insulation sheath.

Thus, in a method for producing a cable, where a cable that comprises at least one litz wire having twisted litz wire strands for conducting electrical current and an insulation sheath surrounding the at least one litz wire for electrical insulation of the at least one litz wire is used, it is provided according to the invention that by removal of the insulation sheath between two cable segments with insulation sheath an interruption segment is produced and that in the interruption segment the at least one litz wire is birdcaged by a countertwisting of the at least one litz wire in a direction opposite to the twisting, in order to interrupt the transport of moisture through the cable, in particular through the at least one litz wire, due to capillary pressure and/or temperature related pressure differences along the cable.

In order to further increase the mutual spacing of the litz wire strands, in particular in the interruption segment, it is provided in a preferred embodiment of the cable according to the invention that the at least one litz wire is a bunched litz wire. In this case the countertwisting for birdcaging corresponds to the direction opposite the bunching or twisting direction.

In order to completely guarantee the electrical function of the cable according to the invention, in addition to the protection against transport of moisture or liquid, it is provided in a preferred embodiment of the cable according to the invention that a protective housing, which is arranged around the entire interruption segment, is provided in order to electrically insulate the at least one litz wire in the interruption segment.

Similarly, it is provided in a preferred embodiment of the method according to the invention that for electrical insulation of the at least one litz wire in the interruption segment a protective housing is arranged around the entire interruption segment.

In this case the protective housing can advantageously be used to establish the position of the interruption segment and the cable segments with insulation sheath with respect to each other. In order to keep the insulation sheath from being able to be shifted from at least one of the two cable segments with insulation sheath into the interruption segment, in a preferred embodiment of the cable according to the invention it is provided that the protective housing have transverse ribs that run transverse to the direction of the cable in the region of the interruption segment, where in directions looking away from the interruption segment and looking along the run of the cable, the insulation sheath of the relevant cable segment with insulation sheath is in each case disposed after one of the cross ribs. That is, if the insulation sheath becomes shifted from one of the cable segments with insulation sheath in the direction of the interruption segment, the nearest transverse rib will, due to a form fit with the insulation sheath, block a shift into the interruption segment In order to be able to guarantee the said form fit in every case and to keep the insulation sheath from slipping through under the transverse ribs, in particular under the nearest transverse rib, in a preferred embodiment of the cable according to the invention it is provided that the transverse ribs contact the at least one litz wire at least segmentwise in the interruption segment.

In order to ensure that even if the transverse ribs lie entirely on the at least one litz wire a pressure equalization from the interruption segment to the external environment can nevertheless take place, in a preferred embodiment of the cable according to the invention it is provided that the transverse ribs respectively have at least one recess. That is, the recesses ensure that the protective housing does not hermetically seal off the interruption segment.

In order to achieve a fixed position of the protective housing on the cable, in a preferred embodiment of the method according to the invention it is provided that the protective housing be connected in a force fit with at least one of the two cable segments with insulation sheath, preferably with both cable segments with insulation sheath. In addition, a securing of the position of the two cable segments and the interruption segment mutually with respect to each other is achieved by the form-fit connection to both cable segments with insulation sheath. In particular, it is ensured by this that the two cable segments cannot be twisted with respect to each other or the interruption segment, in particular not in the direction of rotation of the twist. The latter would have a back twisting of the birdcaged litz wire in the interruption segment as a consequence, through which the litz wire strands would move back closer together there and the capillary action would be produced or increased again.

Similarly, this is why in a preferred embodiment of the cable according to the invention it is provided that the protective housing have at least one lengthwise rib, which essentially runs parallel to the run of the cable in the region of the interruption segment and is connected in a force fit to at least one of the cable segments with insulation sheath, preferably to both cable segments with insulation sheath.

In order to enable an assembly of the protective housing or an assembly of the cable according to the invention with the protective housing that is as simple as possible, in a preferred embodiment of the cable according to the invention it is provided that the protective housing comprise an upper part and a lower part, which can be converted back and forth from an open state to a closed state, where in the open state the interruption segment can be taken out of the protective housing and where in the closed state a position of the interruption segment is limited to at least one position within the protective housing. It goes without saying here that in the open state the interruption segment can naturally also be inserted into the protective housing. In the closed state the position of the protective housing and interruption segment with respect to each other is already fixed at least up to a certain degree. It is sometimes possible that a certain minimal movement of the interruption segment can take place within the protective housing or that such a minimal movement cannot be excluded. Overall, thus in the closed state a result is an at least rough securing of the position of the protective housing and interruption segment with respect to each other or of the at least one litz wire in the region of the interruption segment and the protective housing with respect to each other.

In order to be able to reliably seal and possibly also open again the protective housing, in a preferred embodiment of the cable according to the invention it is provided that the upper part and the lower part in the closed state be separably joined together by means of a lock.

In principle, the lock can be designed in any way, for example with a locking element that is movable on the upper or lower part, in particular, that is mounted so that it can pivot, and that is moved into a corresponding receiving element that is disposed on the other part for locking. In order to be able to realize a constructively especially simple and correspondingly cheap lock, in a preferred embodiment of the cable according to the invention it is provided that the lock can be actuated by elastic deformation of at least a segment of the upper part and/or the lower part. For this the corresponding segments of the upper part and the lower part can, for example, have at least one hook on the one side and at least one eyelet on the other side that accommodates the at least one hook, where through elastic deformation, in particular through an elastic pressing together of the upper part and/or the lower part, the movement of the at least one hook into the at least one eyelet is enabled.

To ensure the electrical insulation of the litz wire in the interruption segment, in principle it is sufficient if the protective housing is designed to be electrically insulating only segmentwise, for example only on the outside, in particular where a user might come into contact with the protective housing, or only on the inside, where a contact between the litz wire and the protective housing could occur. Such an electrical insulation can, for example, take place through an appropriate segmentwise coating with an electrically insulating material. However, in order to ensure the electrical insulation by the protective housing in a simpler and cheaper way, in a preferred embodiment of the cable according to the invention it is provided that the protective housing be made of plastic. Through this material choice the elastic properties of the protective housing can additionally at the same time be established so that the actuation of the lock by elastic deformation of the upper part and/or lower part is enabled. Because of their thermal property, thermoplastics of the groups PA, PP, POM, and PEEK are preferred possibilities as an especially well suited plastic of this kind. It would also be conceivable for the upper part to be made of one plastic and the lower part from a different plastic.

BRIEF DESCRIPTION OF THE FIGURES

The invention will now be explained in more detail by means of an embodiment example.

The drawings are exemplary and are intended to represent the ideas of the invention, but not to limit them in any way or even to conclusively reflect them.

Figure 1A:
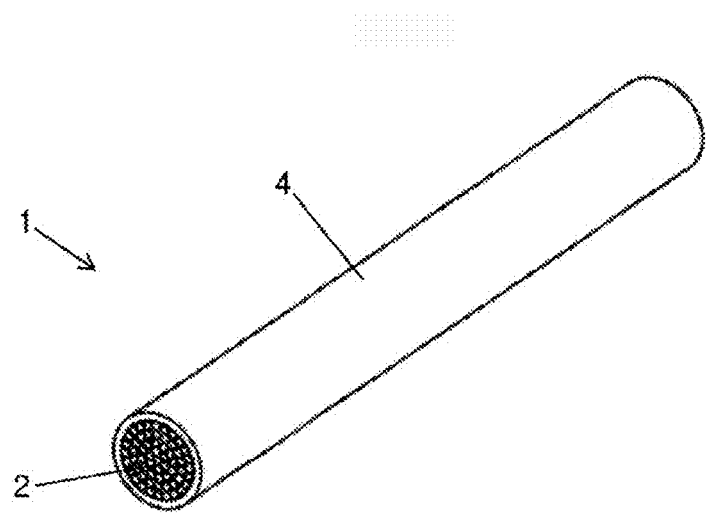

Here:

FIG. 1a shows an axonometric view of a cable according to the prior art

Figure 1B:
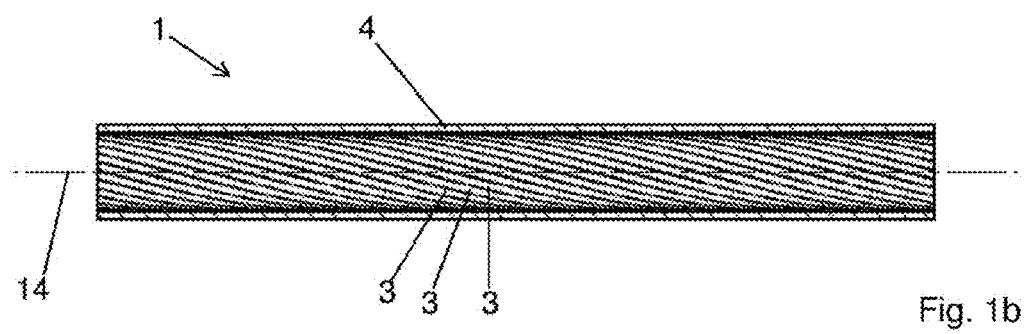
Figure 1C:
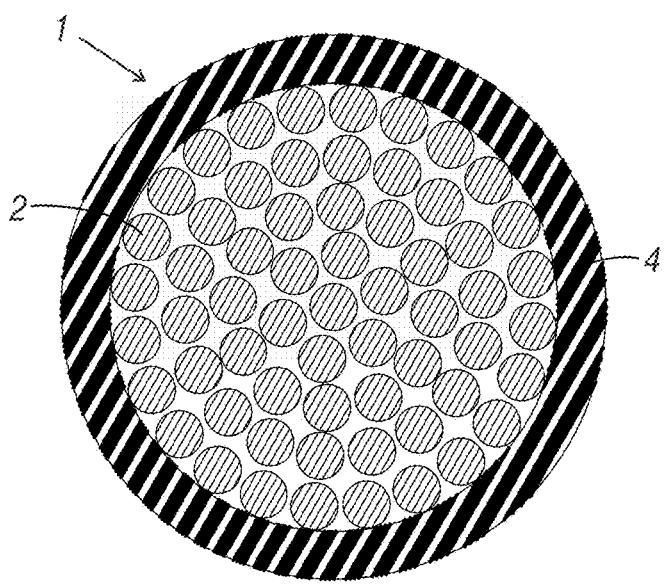
Figure 2A:
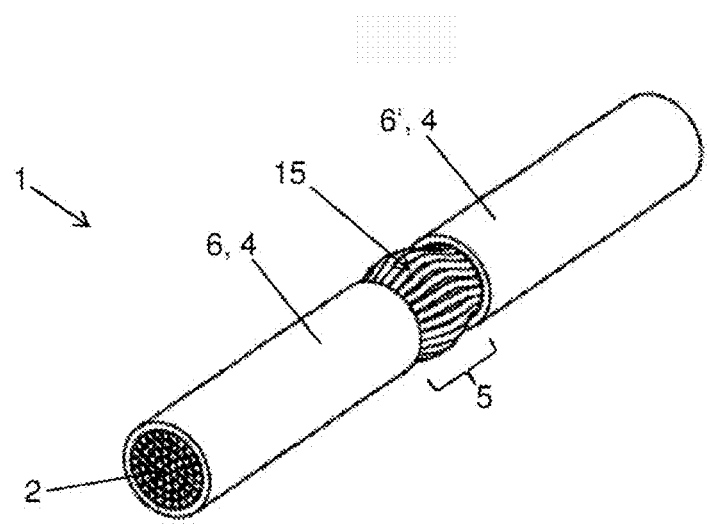
Figure 2B:
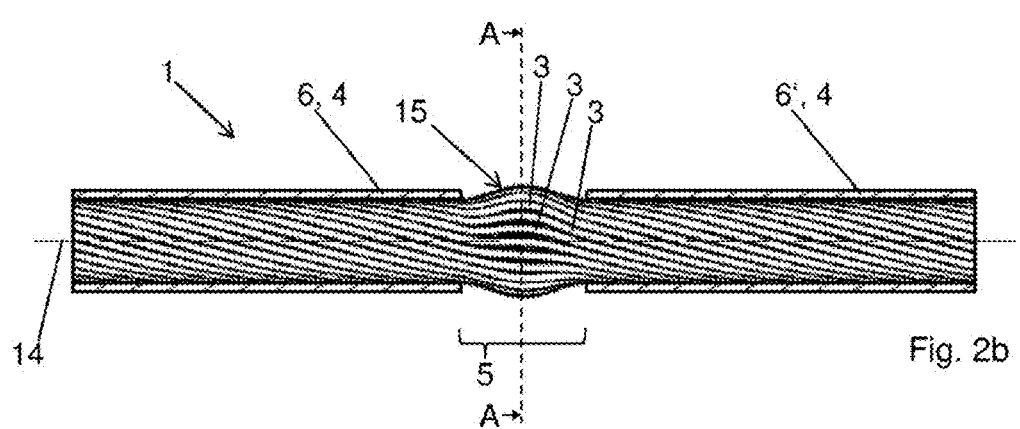
Figure 2C:
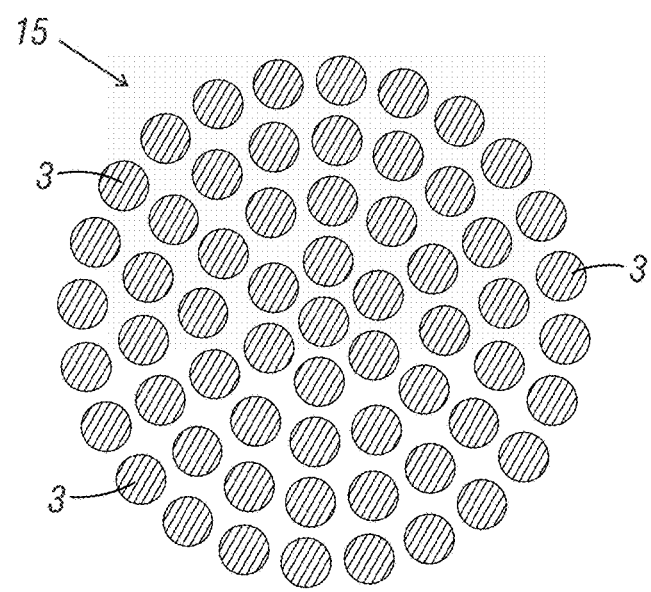
Figure 4A:
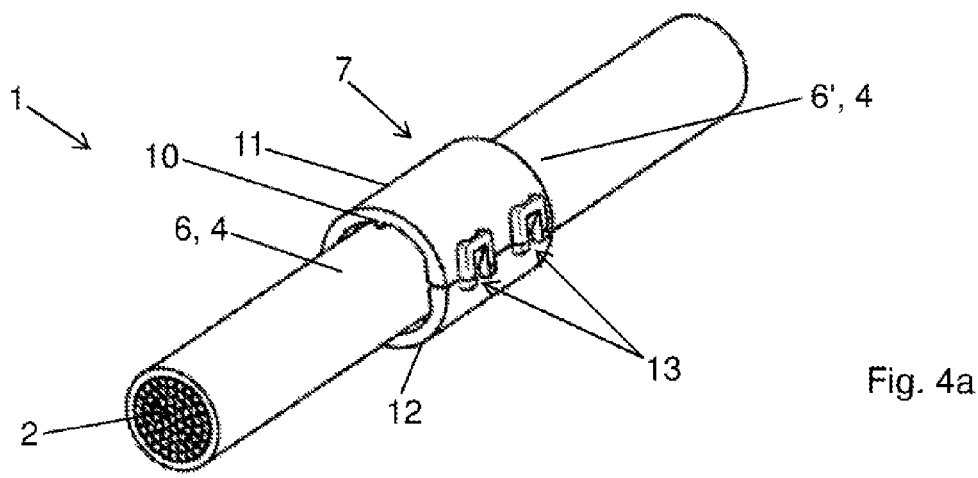
Figure 4B:
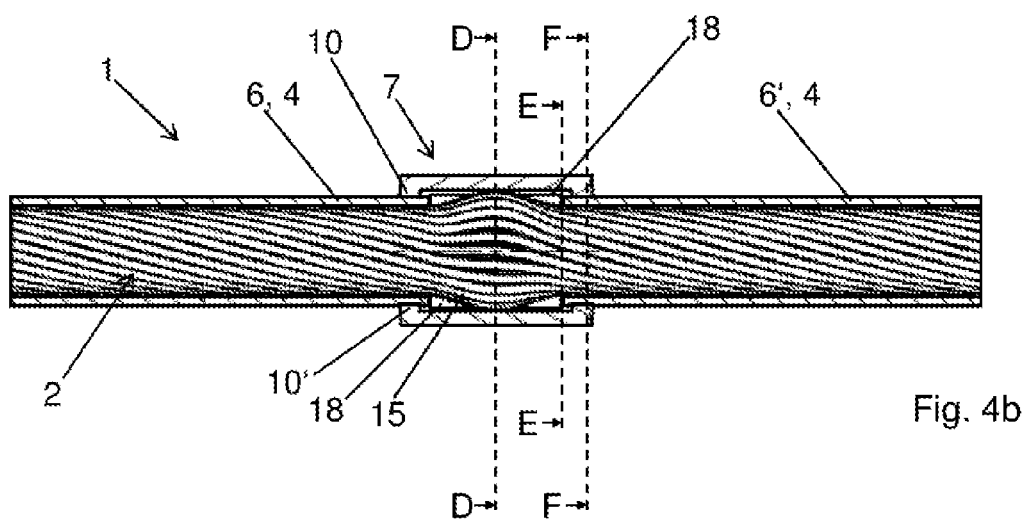
Figure 4C:
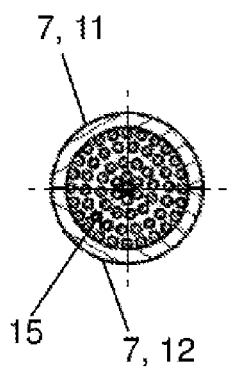
Figure 4D:
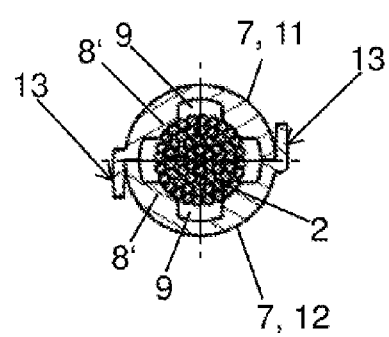
Figure 4E:
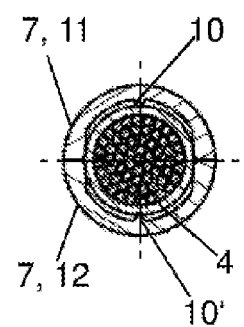

FIG. 1b shows a section view of FIG. 1a, where a lengthwise axis of the cable runs in the cutting plane FIG. 1c shows another section view of FIG. 1a, where the lengthwise axis of the cable is perpendicular to the cutting plane FIG. 2a shows an axonometric view of a cable according to the invention with an interruption segment FIG. 2b shows a section view of FIG. 2a, where the lengthwise axis of the cable runs in the cutting plane FIG. 2c shows a section view along cutting line A-A in FIG. 2b, where the arrows indicate the direction of viewing FIG. 3a shows an axonometric view as in FIG. 2a, where a protective housing with an upper part and a lower part in an open state is additionally shown FIG. 3b shows a section view of FIG. 3a, where the lengthwise axis of the cable runs in the cutting plane FIG. 3c shows a section view along cutting line B-B in FIG. 3b, where the arrows indicate the direction of viewing FIG. 3d shows a section view along cutting line C-C in FIG. 3b, where the arrows indicate the direction of viewing FIG. 4a shows an axonometric view as in FIG. 3a, where the upper part and the lower part of the protective housing are shown in a closed state FIG. 4b shows a section view of FIG. 4a, where the lengthwise axis of the cable runs in the cutting plane FIG. 4c shows a section view along cutting line D-D in FIG. 4b, where the arrows indicate the direction of viewing FIG. 4d shows a section view along cutting line E-E in FIG. 4b, where the arrows indicate the direction of viewing FIG. 4e shows a section view along cutting line F-F in FIG. 4b, where the arrows indicate the direction of viewing

DETAILED DESCRIPTION OF EXEMPLARY EMBODIMENTS OF THE INVENTION

FIG. 1a shows an axonometric view of a cable 1, as is known from the prior art and in particular is used in vehicles. The cable 1 comprises a litz wire 1, which has twisted litz wire strands 3, through which high flexibility and bendability of the cable 1 is ensured.

In FIG. 1b, which shows a section through the cable 1, where a lengthwise axis 14 of the cable 1 runs in the cutting plane, one can easily see that the litz wire strands 3 are twisted, where a direction of rotation of the twisting around the lengthwise axis 14 can be recognized as the twist axis. Additionally, in FIG. 1b one can easily see the insulation sheath 4 surrounding the litz wire 2, which electrically insulates the litz wire 2 or the litz wire strands 3 from the external environment. The insulation sheath 4 is usually made of plastic and is extruded onto the litz wire 2.

The dense arrangement of the twisted litz wire strands 3 emerges from FIG. 1c, which shows a section through the cable 1 perpendicular to the lengthwise axis 14. Correspondingly, voids in the form of thin channels form between the closely spaced litz wire strands 3. If moisture or liquid, in particular water, penetrates into the cable 1, these channels produce a capillary pressure, which transports the moisture or liquid further. Likewise, if there are temperature variations between the ends of the cable 1 or along the cable 1, correspondingly varying pressure differences arise in cable 1 or in the channels, which likewise cause a further transport of the moisture or liquid. The liquid can in this way migrate in the channels through the entire cable 1, which in turn can lead to corrosion of contact points (not shown).

To prevent this and to interrupt the transport of the moisture or liquid in cable 1, according to the invention an interruption segment 5 is provided in channel 1, which can be seen in the axonometric view in FIG. 2a. In interruption segment 5 the insulation sheath 4 is removed or stripped, and the interruption segment 5 is disposed between two cable segments 6, 6', in which the insulation sheath 4 is present. This means that in producing the interruption segment 5 an intermediate removal of the sheath of the litz wire 2 takes place. Further, the litz wire 2 is made into a birdcage form in the interruption segment 5, i.e., the litz wire 2 has a birdcaged segment 15 in interruption segment 5, which is preferably achieved in a simple way by a countertwisting of the litz wire 2 against the direction of rotation of the twisting. The segment 15, which has been birdcaged in this way, is particularly clearly recognizable in the section view of FIG. 2b.

The birdcaging is implemented such that the litz wire 2 is opened up wide, i.e., so that the litz wire strands 3 of the birdcaged litz wire 2 have a spacing from each other that is large enough that the capillary action or the capillary pressure is reduced or is essentially eliminated, so that the liquid or moisture, which has penetrated, for example, into the cable 1 at a contact point, can no longer be transported further. This large distance between the wire strands 3 in the birdcaged segment 15 of the litz wire 2 can readily be seen in FIG. 2c, which shows a section through cutting line A-A in FIG. 2b, where the arrows indicate the direction of viewing. Typically, adjacent litz wire strands 3 no longer contact each other in the birdcaged segment 15. A channel produced by adjacent litz wire strands 3 in this region preferably has an equivalent diameter that is larger than a diameter of the litz wire strands 3.

In addition, a reduced pressure arising in cable 1 because of temperature variations along the run of the cable or at the contact points becomes neutralized or equalized by the intermediate removal of the sheath in interruption segment 5. This means than an excess pressure can escape in interruption segment 5 or, if there is a reduced pressure, air can be drawn into the channels or voids in interruption segment 5.

For electrical insulation of the litz wire 2 in interruption segment 5 in the indicated embodiment example, a protective housing 7 of plastic is provided, which is arranged to surround the entire interruption segment 5. In this embodiment example the protective housing 7 comprises an upper part 11 and a lower part 12, which are shown in an open state in FIG. 3a. This enables simple assembly of the protective housing 7, since in the open state the interruption segment 5 can easily be guided into the protective housing 7 and optionally also backed out of the protective housing 7, or the protective housing 7 can be precisely positioned over the interruption segment 5.

The upper part 11 and lower part 12 can be converted to a closed state, which is shown, for example, in FIG. 4a. Basically, in closed state a position of the interruption segment 5 is limited to at least one position within the protective housing 7. This means that the position of protective housing 7 and interruption segment 5 with respect to each other in the closed state is already fixed at least up to a certain degree. Here it is sometimes possible that a certain minimal movement of the interruption segment 5 within the protective housing 7 can take place or that such a minimal movement cannot be excluded.

In order to be able to hold upper part 11 and lower part 12 securely in the closed state on the one hand and to be able to possibly convert them to the open state again on the other hand, a lock 13 is provided. The lock 13 in this embodiment example comprises lock hooks 16 disposed on the upper part 11 and lock eyelets 17 disposed on the lower part 12. Through elastic deformation of upper part 11 and lower part 12, in particular by a pressing together of the upper part 11 parallel to a direction transverse to the lengthwise axis 14, upper part 11 and lower part 12 can be positioned with respect to each other so that the lock hooks 16 are brought into congruence with the lock eyelets 17. Then a release of the pressure on the upper part 11 causes a latching of the lock hooks 16 in the lock eyelets 17. To switch back to the open state one analogously follows the reverse sequence of operations.

Besides the function of electrical insulation, the protective housing 7 in this embodiment example also serves to keep the insulation sheath 4 from being able to be shifted from the two cable segments 6, 6' into the interruption segment. For this, the protective housing 7 has two transverse ribs 8, 8', which respectively run transverse to the run of the cable 1 in the region of the interruption segment 5. Parts of each transverse rib 8, 8' are made both in the upper part 11 and in lower part 12. The arrangement of the transverse ribs 8 in protective housing 7 and the positioning of the protective housing 7 are chosen so that in a direction pointing away from interruption segment 5 and looking along the run of the cable 1 the insulation sheath 4 of the cable segment 6 is disposed immediately after the transverse rib 8. The arrangement of the transverse rib 8' in protective housing 7 and the positioning of the protective housing 7 are chosen so that looking in the opposite direction the insulation sheath 4 of the cable segment 6' is disposed immediately after the transverse rib 8'. This means that the transverse ribs 8, 8' are still arranged in the region of the interruption segment 5, over the litz wire 2.

This arrangement follows very clearly from the section view in FIG. 3b. The section view in FIG. 3d further illustrates that the transverse ribs 8, 8' are disposed at the edge of the interruption segment 5, where the litz wire 2 is not yet birdcaged or at least by comparison with the region in the center of the interruption segment 5 that is shown in FIG. 3c is birdcaged only a very little. Because of this arrangement of the transverse ribs 8, 8', the transverse ribs 8, 8' in the closed state prevent a shifting of the insulation sheath 4 of the cable segments 6, 6' into the interruption segment 5 due to a form fit with the insulation sheath 4.

FIG. 4b, FIG. 4c, and FIG. 4d show section views corresponding to FIG. 3b, FIG. 3c, and FIG. 3d in the closed state. In particular in FIG. 4d one can see that the transverse ribs 8 contact the litz wire 2. In general, the possible form fit between the transverse ribs 8, 8' and the insulation sheath 4 of the cable segments 6, 6' is ensured by the at least sectionwise contact between the transverse ribs 8, 8' and the litz wire 2. More specifically, this keeps the insulation sheath 4 of the cable segments 6, 6' from being able to be shifted between the litz wire 2 and the transverse ribs 8, 8'.

To ensure that a pressure equalization from the interruption segment 5 to the external environment can nevertheless take place even if the transverse ribs 8, 8' lie completely against the litz wire 2, each of the transverse ribs 8, 8' has four recesses 9. This means that the recesses 9 ensure that the protective housing 7 does not hermetically seal off the interruption segment 5.

The transverse ribs 8, 8' are made flattened out in the direction of the middle of the protective housing 7, in order to offer the birdcaged litz wire 15 space. Further, a free space 18 is provided along the lengthwise axis 14 between the transverse ribs 8, 8', in order to increase further the space for the birdcaged litz wire 15. This can easily be seen in the section views of FIG. 3b and FIG. 4b.

Further, the protective housing 7 in this embodiment has lengthwise ribs 10, 10', which respectively run essentially parallel to the run of the cable 1 in the region of the interruption segment 5. The lengthwise rib 10 is made in the upper part 11 and the lengthwise rib 10' is made in the lower part 12.

In the closed state the two lengthwise ribs 10, 10' are connected to the insulation sheath 4 of the cable segments 6, 6' in a force fit, as can be seen in particular in FIG. 4e. Through this a securing of position of the protective housing 7 to the cable segments 6, 6' and to interruption segment 5 is achieved on the one hand, while on the other hand a securing of position of the two cable segments 6, 6' and the interruption segment 5 mutually with respect to each other is also ensured via the protective housing 7. Correspondingly, the cable segments 6, 6' cannot be rotated with respect to one another and interruption segment 5, in particular cannot be rotated in the direction of rotation of the twist. The latter would have a back twisting of the birdcaged litz wire 2 in interruption segment 5 as a consequence, due to which the wire strands 3 there would move again closer to each other and the capillary effect would be produced or increased again.

REFERENCE NUMBER LIST

1 Cable
2 Litz wire
3 Litz wire strand
4 Insulation sheath
5 Interruption segment of cable
6, 6' Cable segment with insulation sheath
7 Protective housing
8, 8' Transverse rib of protective housing
9 Recess of transverse rib
10, 10' Lengthwise rib 11 Upper part of protective housing
12 Lower part of protective housing
13 Lock of upper part and lower part
14 Lengthwise axis of cable
15 Birdcaged segment of litz wire
16 Lock hooks
17 Lock eyelets
18 Free space between transverse ribs

What is claimed is:

1. A cable comprising: at least one litz wire having twisted litz wire strands for conducting electrical current and an insulation sheath surrounding the at least one litz wire for electrical insulation of the at least one litz wire, where the cable has an interruption segment without insulation sheath disposed between two cable segments with insulation sheath, characterized in that the at least one litz wire is birdcaged in the interruption segment in order to interrupt the transport of moisture through the cable, in particular through the at least one litz wire due to capillary pressure and/or temperature-related pressure differences along the cable, and the interruption segment is not sealed so that a pressure equalization to the external environment takes place.

2. The cable as in claim 1, characterized in that the at least one litz wire is a bunched litz wire.

3. The cable as in claim 1, characterized in that a protective housing is provided, which is disposed around the entire interruption segment in order to electrically insulate the at least one litz wire in the interruption segment.

4. The cable as in claim 3, characterized in that the protective housing has transverse ribs, which run transverse to the run of the cable in the region of the interruption segment, where in directions looking away from the interruption segment and looking along the run of the cable the insulation sheath of the relevant cable segment with insulation sheath is disposed in each case after one of the transverse ribs.

5. The cable as in claim 4, characterized in that the transverse ribs at least segmentwise contact the at least one litz wire in the interruption segment.

6. The cable as in claim 4, characterized in that the transverse ribs respectively have at least one recess.

7. The cable as in claim 3, characterized in that the protective housing has at least one lengthwise rib, which runs essentially parallel to the run of the cable in the region of the interruption segment and is connected by force fit with at least one of the cable segments with insulation sheath.

8. The cable as in claim 7 characterized in that the at least one of the two cable segments comprises both cable segments.

9. The cable as in claim 3, characterized in that the protective housing comprises an upper part and a lower part, which can be converted from an open state to a closed state and back, where in the open state the interruption segment can be taken out of the protective housing and where in the closed state a position of the interruption segment is limited to at least one position within the protective housing.

10. The cable as in claim 9, characterized in that the upper part and the lower part in the closed state are detachably connected to each other by means of a lock.

11. The cable as in claim 10, characterized in that the lock can be actuated by elastic deformation of at least one segment of the upper part and/or the lower part.

12. The cable as in claim 3, characterized in that the protective housing is made of plastic.

13. A method for producing a cable comprising: where a cable that comprises at least one litz wire having twisted litz wire strands for conducting electrical current and an insulation sheath surrounding the at least one litz wire for electrical insulation of the at least one litz wire, where an interruption segment is made by stripping the insulation sheath between two cable segments with insulation sheath, wherein the interruption segment the at least one litz wire is birdcaged by a countertwisting of the at least one litz wire against a direction of rotation of the twist, in order to interrupt the transport of moisture through the cable, in particular thorough the at least one litz wire, because of capillary pressure and/or temperature-related pressure differences along the cable, and the interruption section is not sealed so that a pressure equalization to the external environment takes place in the interruption segment.

14. The method as in claim 13, characterized in that for electrical insulation of the at least one litz wire in the interruption segment a protective housing is disposed around the entire interruption segment.

15. The method as in claim 14, characterized in that the protective housing is connected by force fit with at least one of the two cable segments with insulation sheath.

16. The method as in claim 15 characterized in that the at least one of the two cable segments comprises both cable segments.

* * * * *